United States Patent Office 3,227,541
Patented Jan. 4, 1966

3,227,541
HERBICIDAL COMPOSITION AND METHOD
Robert F. Crawford, La Mirada, Calif., assignor to United States Borax & Chemical Corporation, Los Angeles, Calif., a corporation of Nevada
No Drawing. Filed Aug. 27, 1962, Ser. No. 219,789
9 Claims. (Cl. 71—2.4)

This invention relates to novel herbicidal compositions and methods of eradicating plant growth, and more particularly this invention relates to herbicidal compositions and methods utilizing synergistic mixtures of sodium metaborate and substituted uracils.

The herbicidal activity of borates has long been known to the art, but they have several disadvantages, such as relatively low phytotoxicity and slow initial action. Also, a large group of uracils has recently been reported as having herbicidal activity, but they also suffer the disadvantage of relatively slow initial action. Accordingly, a herbicidal composition overcoming these disadvantages, yet retaining the long-term herbicidal action of the borates, would be very useful.

It is, therefore, the principal object of this invention to provide novel herbicidal compositions.

It is a further object of this invention to provide synergistic herbicidal compositions having rapid initial action and good long-term activity. A still further object of this invention is to provide methods for eradicating plant growth. Other objects will become obvious from the following disclosure.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

This invention provides herbicidal compositions comprising sodium metaborate and a substituted uracil of the formula

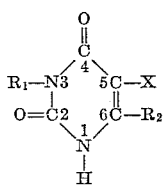

where $R_1$ is selected from the group consisting of the secondary and tertiary alkyl radicals having three to about eight carbon atoms, $R_2$ is an alkyl radical having one to about four carbon atoms, and X is a halogen atom selected from the group consisting of bromine and chlorine; said compositions having a weight ratio of metaborate to uracil of from about 3:1 to about 1000:1. The invention also provides methods for eradicating plant growth by applying said compositions to the locus of the plants.

The substituted uracils useful in this invention can be represented by the above formula in which $R_1$, $R_2$ and X have the significance previously assigned. Examples of suitable radicals represented by $R_1$ include isopropyl, sec-butyl, tert-butyl, tert-amyl, sec-heptyl, tert-octyl and sec-hexyl. Examples of radicals represented by $R_2$ are methyl, ethyl, propyl, isopropyl and butyl. Typical examples of suitable uracils are:

3-isopropyl-5-bromo-6-methyluracil
3-isopropyl-5-chloro-6-methyluracil
3-sec-butyl-5-bromo-6-methyluracil
3-isopropyl-5-bromo-6-ethyluracil
3-3-tert-amyl-5-chloro-6-methyluracil
3-sec-heptyl-5-bromo-6-methyluracil
3-sec-octyl-5-bromo-6-methyluracil The presently preferred uracil is 3-isopropyl-5-bromo-6-methyluracil.

Sodium metaborate, equivalent to a combination of one mole of sodium oxide and one mole of boric oxide, is an old compound, well known to the art. It is commonly used in the hydrated form, but for convenience, all parts by weight herein are expressed as parts by weight of nonhydrated sodium metaborate, unless indicated otherwise.

The herbicidal compositions of this invention comprise a combination of sodium metaborate and the uracil in a weight ratio of from about 3:1 to about 1000:1, with a preferred combination ratio being in the range of about 10 to 50 parts by weight of sodium metaborate to each part by weight of the uracil. Thus, sodium metaborate comprises more than about 75%, and preferably, more than 90% by weight of the combination.

The combination of sodium metaborate and the uracil exhibits a synergistic phytotoxic action which is greater than either of the compounds alone. This response has been found by three modes of action: (1) inhibition of germination, (2) foliar uptake, and (3) root uptake.

The compositions are applied to the locus of the plants to be eradicated, that is, they can be applied to the foliage of the growing plant, or to soil in which the plant is growing or will grow. The compositions can be applied as a dry formulation or they can be dissolved or dispersed in a liquid carrier such as water. An application rate of about 25 to about 1600 pounds of the composition per acre is generally used, with about 100 to 400 pounds per acre being preferred for most plant species. The compositions are non-selective; that is, they kill most plant species at the suggested rates of application. The hericidal action is evident shortly after application and is persistent over a long period of time.

Dry formulations can be prepared, as for example, by mixing together the uracil, sodium metaborate in a water-deficient form, and water as described by Stone et al., U.S. Patent Number 2,904,423. Liquid formulations can be prepared by dissolving or dispersing the uracil and metaborate in a liquid carrier such as water, following procedures well known to those skilled in the art. Surface active agents, such as wetting agents and emulsifying agents, stickers, and other formulation and coverage aids can also be included in dry or liquid formulations. Other inorganic and organic herbicides can also be included for specific application and control problems. For example, sodium chlorate can be included to give a particularly useful composition with enhanced initial contact injury.

The following examples are presented for illustration but are not to be considered as limiting the invention.

EXAMPLE 1

The following test was used to determine the phytotoxicity caused by foliar application of the herbicides.

Four Black Valentine bean seeds were planted in a one-half gallon waxed carton containing a potting mixture of half vermiculite and half soil. The plants were watered solely by sub-irrigation to insure that herbicide treatments on the foliage would not be washed off the foliage and onto the soil with resulting root uptake. Ten days after planting, the plants were treated with aqueous solutions of the herbicides by dipping one primary leaf into the test solution for a period of 30 minutes. Four test solutions were used: (1) a control containing no herbicide, (2) a solution containing 3-isopropyl-5-bromo-6-methyluracil as the sole herbicide, (3) a solution containing sodium metaborate as the sole herbicide, and (4) a solution containing a combination of sodium metaborate and 3-isopropyl-5-bromo-6-methyluracil. The plants were examined three and seven days after treatment and the phytotoxicity recorded as in Table I.

Table I

| Solution | Herbicide | Amount (p.p.m.) | Phytotoxicity after— | |
|---|---|---|---|---|
| | | | 3 days | 7 days |
| 1 | None (control) | 0 | None | None. |
| 2 | Uracil | 10 | ___do___ | Trace. |
| 3 | Sodium metaborate | 9,699 | ___do___ | None. |
| 4 | {Sodium metaborate, Uracil} | 9,699 / 10 | Moderate | Severe. |

Thus, as the data illustrates, the combination of uracil and metaborate gave a more rapid and greater amount of phytotoxicity than either of the individual herbicides.

EXAMPLE 2

The following tests were to determine the phytotoxicity caused by root uptake of the herbicides in the absence of the complicating soil factor.

Black Valentine bean seeds were germinated on a moist blotter in Petri dishes by incubating at 25° C. for four days in the dark. Plants of vigorous growth were selected from the germinated seeds and placed in a solution culture. Three bean plants were grown in each 1500 ml. beaker containing 1250 ml. of nutrient solution. Six days after starting the plants in the solution culture, the test herbicides were added to the nutrient solution. Seven and eleven days later the plants were examined and the phytotoxicity recorded as in Table II. The uracil used in each test was 3-isopropyl-5-bromo-6-methyluracil. In Test No. 10, sodium hydroxide equivalent to the alkalinity of 12.2 p.p.m. of sodium metaborate was combined with the uracil so as to determine the effect of the alkalinity of the sodium metaborate.

Table II

| Test No. | Herbicide | Amount (p.p.m.) | Phytotoxicity after— | |
|---|---|---|---|---|
| | | | 7 days | 11 days |
| 1 | None (control) | 0 | None | None. |
| 2 | Uracil | 0.01 | ___do___ | Trace. |
| 3 | Sodium metaborate | 61 | Slight | Moderate. |
| 4 | {Uracil, Sodium metaborate} | 0.01 / 61 | Moderate | Severe. |
| 5 | Uracil | 0.1 | None | Moderate. |
| 6 | {Uracil, Sodium metaborate} | 0.1 / 61 | Severe | {Complete. Kill. |
| 7 | Uracil | 0.1 | | Moderate.* |
| 8 | Sodium metaborate | 12.2 | | Slight.* |
| 9 | {Uracil, Sodium metaborate} | 0.1 / 12.2 | | Complete.* Kill. |
| 10 | {Uracil, NaOH} | 0.1 / 7.65 | | Moderate.* |

*Phytotoxicity recorded after 10 days.

Again, the data shows that the combination of sodium metaborate and the uracil was much more active than either of the individual materials with respect to both speed of action and phytotoxicity. Also, Test No. 10 demonstrates that the synergistic effect was not due to the alkalinity produced by the metaborate.

The following are additional examples of suitable herbicidal compositions containing the novel metaborate-uracil combinations of this invention. The amount of each component is expressed as percent by weight.

EXAMPLE 3

| | Percent |
|---|---|
| 3-isopropyl-5-bromo-6-methyluracil | 4.0 |
| Sodium metaborate tetrahydrate | 96.0 |

EXAMPLE 4

| | |
|---|---|
| 3-sec.-butyl-5-bromo-6-methyluracil | 2.0 |
| Sodium metaborate tetrahydrate | 98.0 |

EXAMPLE 5

| | |
|---|---|
| 3-isopropyl-5-bromo-6-methyluracil | 0.8 |
| Sodium metaborate | 19.0 |
| Alkylphenoxypolyethoxyethanol surfactant | 0.2 |
| Water | 80.0 |

EXAMPLE 6

| | |
|---|---|
| 3-isopropyl-5-bromo-6-methyluracil | 0.5 |
| Sodium metaborate | 10.0 |
| Sodium chlorate | 7.0 |
| Alkylphenoxypolyethoxyethanol surfactant | 0.1 |
| Water | 82.4 |

Other modes of applying the principle of the invention may be employed, change being made as regards the details described, provided the features stated in any of the following claims or the equivalent of such be employed.

I, therefore, particularly point out and distinctly claim as my invention:

1. A herbicidal composition having rapid initial action and long-term activity comprising sodium metaborate and a substituted uracil selected from the group consisting of 3-isopropyl-5-bromo-6-methyluracil and 3-sec.-butyl-5-bromo-6-methyluracil; said composition having a weight ratio of metaborate to uracil of from about 3:1 to about 1000:1.

2. The composition of claim 1 in which said weight ratio of metaborate to uracil is about 10:1 to about 50:1.

3. The composition of claim 1 in which said composition contains sodium chlorate.

4. A herbicidal composition having rapid initial action and long-term activity comprising sodium metaborate and 3-isopropyl-5-bromo-6-methyluracil, said composition having a weight ratio of metaborate to said uracil of about 3:1 to about 1000:1.

5. The composition of claim 4 in which said weight ratio of metaborate to uracil is about 10:1 to about 50:1.

6. The method of eradicating plant growth which comprises applying to the locus of said plants a phytotoxic amount of a synergistic mixture of sodium metaborate and a substituted uracil selected from the group consisting of 3-isopropyl-5-bromo-6-methyluracil and 3-sec.-butyl-5-bromo-6-methyluracil.

7. The method of claim 6 in which said substituted uracil is 3-isopropyl-5-bromo-6-methyluracil.

8. A herbicidal composition having rapid initial action and long-term activity comprising sodium metaborate and 3-sec.-butyl-5-bromo-6-methyluracil, said composition having a weight ratio of metaborate to said uracil of about 3:1 to about 1000:1.

9. The method of claim 6 in which said substituted uracil is 3-sec.-butyl-5-bromo-6-methyluracil.

References Cited by the Examiner

UNITED STATES PATENTS

| 2,969,364 | 1/1961 | Lyttle | 771—2.5 X |
| 3,002,975 | 10/1961 | Slezak | 71—2.5 X |
| 3,004,844 | 10/1961 | Stahler et al. | 71—2.4 |

FOREIGN PATENTS

| 63,575 | 2/1961 | Australia. |
| 1,270,771 | 7/1961 | France. |

LEWIS GOTTS, *Primary Examiner.*

JULIAN S. LEVITT, JAMES O. THOMAS,
*Assistant Examiners.*